(12) United States Patent
Kitagaki

(10) Patent No.: US 12,461,690 B2
(45) Date of Patent: Nov. 4, 2025

(54) MEMORY SYSTEM WITH DUMMY READ BEFORE PATROL READ

(71) Applicant: Kioxia Corporation, Tokyo (JP)

(72) Inventor: Kazukuni Kitagaki, Sagamihara Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/459,376

(22) Filed: Aug. 31, 2023

(65) Prior Publication Data

US 2024/0201903 A1 Jun. 20, 2024

(30) Foreign Application Priority Data

Dec. 19, 2022 (JP) .............................. 2022-202493

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | |
|---|---|---|
| 2009/0049254 A1 | 2/2009 | Koga |
| 2013/0080716 A1 | 3/2013 | Tamura |
| 2014/0040680 A1 | 2/2014 | Takaku |
| 2014/0293705 A1 * | 10/2014 | Gillingham ............. H01L 25/18 |
| | | 365/185.18 |
| 2015/0254009 A1 * | 9/2015 | Eguchi .................. G06F 3/0661 |
| | | 711/147 |
| 2018/0275884 A1 * | 9/2018 | Riedy ................. G06F 12/0868 |
| 2018/0276073 A1 | 9/2018 | Ide |
| 2019/0074283 A1 * | 3/2019 | Amaki .................... G11C 16/16 |
| 2019/0087106 A1 | 3/2019 | Masakawa |
| 2019/0088333 A1 | 3/2019 | Shirakawa |
| 2020/0301770 A1 | 9/2020 | Masakawa |
| 2021/0232323 A1 * | 7/2021 | Kannan ................. G06F 3/0688 |
| 2021/0294521 A1 * | 9/2021 | Suzuki .................. G06F 3/0679 |
| 2022/0392516 A1 * | 12/2022 | Cha .................... G11C 29/4401 |

FOREIGN PATENT DOCUMENTS

| | | | |
|---|---|---|---|
| JP | 2009048224 | A | 3/2009 |
| JP | 2013069183 | A | 4/2013 |
| JP | 5605507 | B2 | 10/2014 |
| JP | 2018160065 | A | 10/2018 |
| JP | 2019046530 | A | 3/2019 |
| JP | 2019057340 | A | 4/2019 |
| JP | 2019057346 | A | 4/2019 |
| JP | 2020154728 | A | 9/2020 |

* cited by examiner

*Primary Examiner* — Ryan Bertram
*Assistant Examiner* — Edmund H Kwong
(74) *Attorney, Agent, or Firm* — Kim & Stewart LLP

(57) ABSTRACT

According to one embodiment, a semiconductor integrated circuit, also referred to as a bridge chip or circuit, has a first interface circuit configured to be connected to a control device and a second interface circuit configured to be connected to a memory chip. A controller in the integrated circuit is configured to transfer a first command sequence for commanding a dummy read operation on a storage region of the memory chip via the second interface circuit before executing a patrol read operation on the storage region of the memory chip based on a request from the control device received via the first interface circuit.

20 Claims, 12 Drawing Sheets

MEMORY SYSTEM WITH DUMMY READ BEFORE PATROL READ

CROSS-REFERENCE TO RELATED APPLICATION

This application is based upon and claims the benefit of priority from Japanese Patent Application No. 2022-202493, filed Dec. 19, 2022, the entire contents of which are incorporated herein by reference.

FIELD

Embodiments described herein relate generally to a semiconductor integrated circuit, a semiconductor storage device incorporating a semiconductor integrated circuit, and a memory system incorporating a semiconductor storage device.

BACKGROUND

There is a type of semiconductor storage device in which a semiconductor integrated circuit called a bridge chip is used between memory chips and an external terminal group that is connected to an external controller (a memory controller). In the semiconductor storage device, data transfer is performed between the memory controller and the memory chips via the bridge chip. A memory system including such a semiconductor storage device is also known.

In the memory system, in order to check the status of data stored in a storage region provided in the memory chips, a read operation may be executed on one or more unit regions of the storage region. Such a read operation is also called a patrol read operation. An example of the unit region in this context is a block.

DETAILED DESCRIPTION

Embodiments provide a semiconductor integrated circuit, a semiconductor storage device, and a memory system for which the time required for a read operation is reduced.

In general, according to one embodiment, a semiconductor integrated circuit includes a first interface circuit configured to be connected to a control device and a second interface circuit configured to be connected to a memory chip. A controller in the semiconductor circuit is configured to transfer a first command sequence for commanding a dummy read operation on a storage region of the memory chip via the second interface circuit before executing a patrol read operation on the storage region of the memory chip based on a request from the control device received via the first interface circuit.

A semiconductor integrated circuit, a semiconductor storage device, and a memory system according to an embodiment will be described with reference to the accompanying drawings. The present disclosure is not limited by these specific example embodiments.

Embodiment

Figure 1:
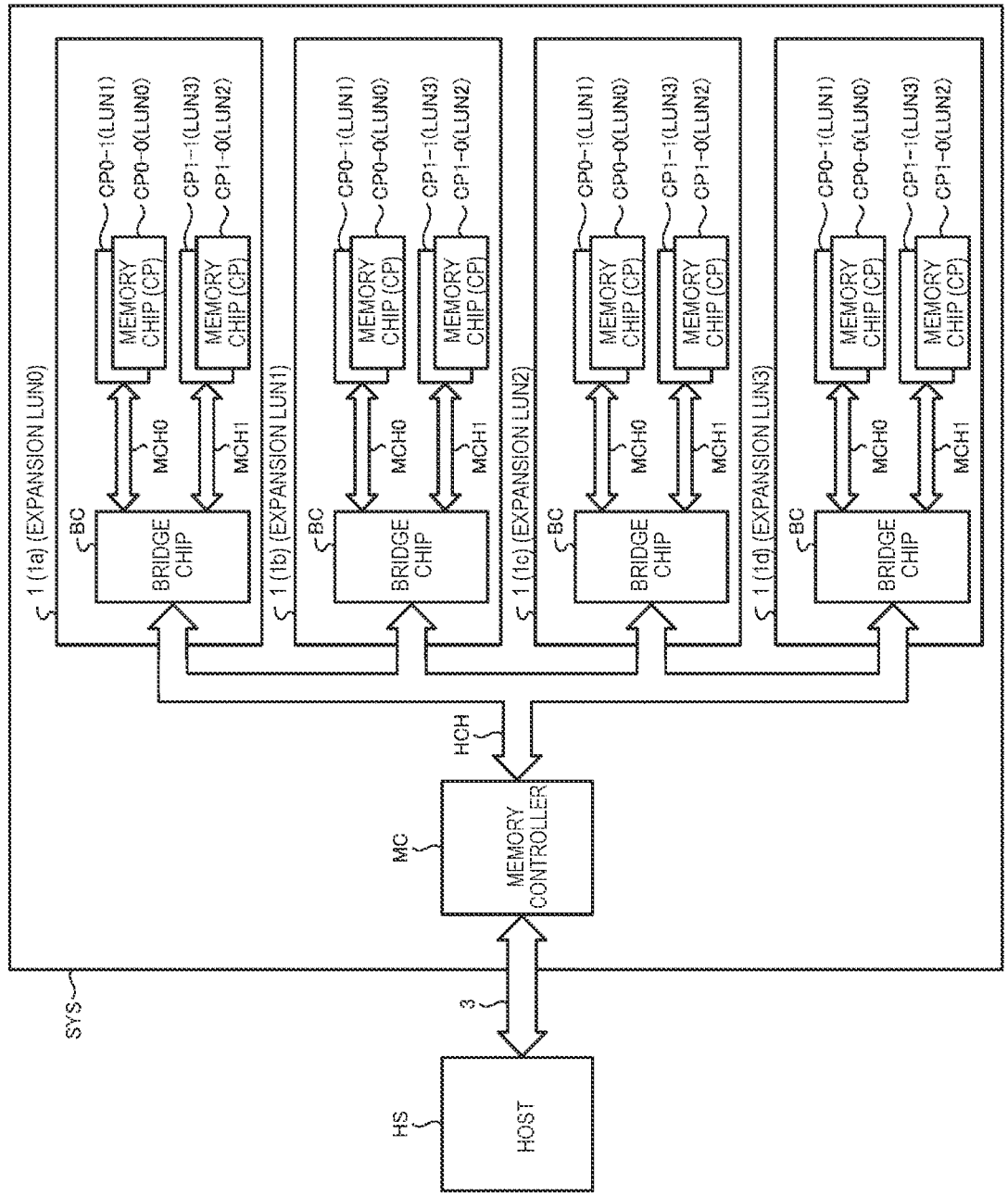
FIG. 1 is a schematic diagram of a memory system according to an embodiment.

FIG. 1 is a schematic diagram showing an example of the configuration of a memory system SYS according to an embodiment.

The memory system SYS may be connectable to a host HS via the communication path 3. The host HS is a computer. The computer may be, for example, a personal computer, a portable computer, a server, or a mobile communication device. The memory system SYS functions as an external storage device for the host HS.

The memory system SYS includes a memory controller MC and a plurality of semiconductor storage devices 1. A memory controller MC is connected to the host HS via a communication path 3. The memory system SYS includes four semiconductor storage devices 1a, 1b, 1c, and 1d, for example.

Each semiconductor storage device 1 includes a bridge chip BC and a plurality of memory chips CP. In this example, each semiconductor storage device 1 includes four memory chips CP0-0, CP0-1, CP1-0, and CP1-1. The bridge chip BC is an example of a semiconductor integrated circuit.

Each semiconductor storage device 1 may be implemented as a Multi-Chip Package (MCP) in which the four memory chips CP0-0, CP0-1, CP1-0, and CP1-1 are stacked. When each semiconductor storage device 1 is implemented as a MCP, the bridge chip BC and the four memory chips CP0-0, CP0-1, CP1-0, and CP1-1 may be encapsulated in a molded resin.

Each memory chip CP is given a Logical Unit Number (LUN) which is a unique identification number within the semiconductor storage device 1. Also, each semiconductor storage device 1 is given an expansion LUN, which is a unique identification number within the memory system SYS. In the example shown in FIG. 1, the semiconductor storage device 1a is given an expansion LUN0, the semiconductor storage device 1b is given an expansion LUN1, the semiconductor storage device 1c is given an expansion LUN2, and the semiconductor storage device 1d is given an expansion LUN3. In each semiconductor storage device 1, the memory chips CP0-0 are given LUN0, the memory chips CP0-1 are given LUN1, the memory chips CP1-0 are given LUN2, and the memory chips CP1-1 are given LUN3.

In the memory system SYS, the four semiconductor storage devices 1 are connected to the memory controller MC via a predetermined type bus. In this specification, the bus is referred to as a host channel HCH because it is on a side of the host HS when viewed from the bridge chip BC provided in each of the four semiconductor storage devices 1. In the embodiment, the four semiconductor storage devices 1 are all connected in common to the host channel HCH.

In each semiconductor storage device 1, four memory chips CP are connected to a bridge chip BC via a plurality of buses. In this specification, each of these buses are referred to as a memory channel MCH because it is on a side of the memory chip CP when viewed from the bridge chip BC. In the embodiment, each semiconductor storage device 1 has two memory channels MCH0 and MCH1. The memory chips CP0-0 and CP0-1 are connected in common to the memory channel MCH0, and the memory chips CP1-0 and CP1-1 are connected in common to the memory channel MCH1.

When each memory chip CP provided in four semiconductor storage devices 1 is a NAND flash memory, the standards of the host channel HCH and the memory channel MCH are, for example, a toggle Double Data Rate (DDR) standard. In the present example, it is assumed that each memory chip CP provided in the semiconductor storage devices 1 is a NAND flash memory, and the standards of the host channel HCH and the memory channel MCH are the toggle DDR standard.

Figure 2:
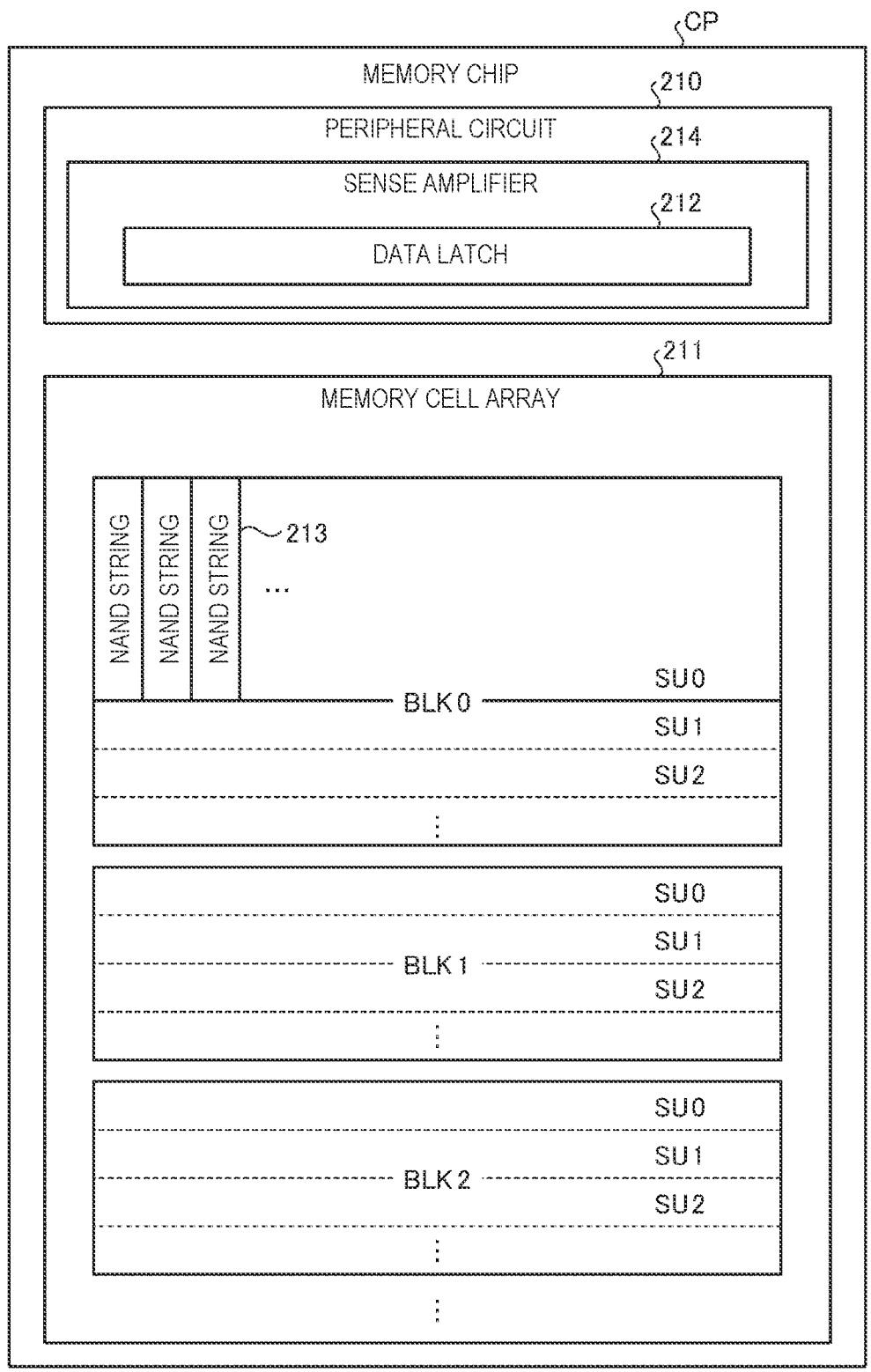
FIG. 2 is a schematic diagram of a memory chip according to an embodiment.

FIG. 2 is a schematic diagram showing an example of a configuration of a memory chip CP according to the embodiment. The memory chip CP includes a peripheral circuit 210 and a memory cell array 211.

The memory cell array 211 includes a plurality of blocks BLK (BLK0, BLK1, . . . ) each of which is a group of non-volatile memory cell transistors. Each block BLK includes a plurality of string units SU (SU0, SU1, . . . ) each of which is a group of memory cell transistors associated with word lines and bit lines. Each string unit SU includes a plurality of NAND strings 213 in which memory cell transistors are connected in series. The number of NAND strings 213 in the string unit SU is arbitrary.

The peripheral circuit 210 includes a sense amplifier 214. The sense amplifier 214 includes a data latch 212 capable of temporarily storing data. The peripheral circuit 210 executes a program operation which is an operation of transferring data stored in the data latch 212 to the memory cell array 211 via the sense amplifier 214, a sense operation which is an operation of transferring data from the memory cell array 211 to the data latch 212 via the sense amplifier 214, and an erase operation of erasing data stored in the memory cell array. As the configuration for executing the operations, the peripheral circuit 210 includes a row decoder, a column decoder, and a voltage generating circuit in addition to the sense amplifier 214.

Figure 3:
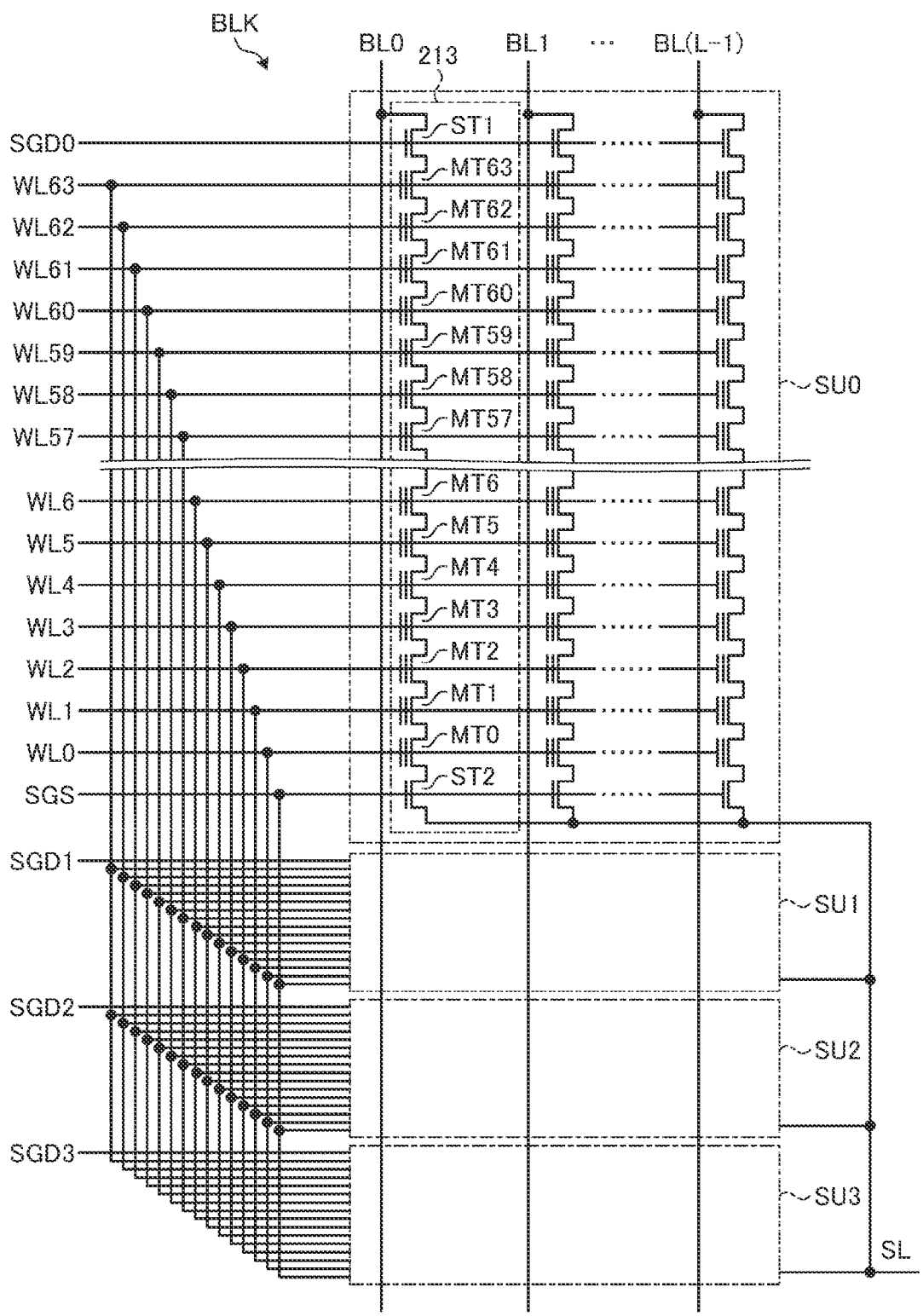
FIG. 3 is a schematic diagram showing a circuit configuration of a block according to an embodiment.

FIG. 3 is a schematic diagram showing a circuit configuration of the block BLK according to the embodiment. Each block BLK has the same configuration. The block BLK has, for example, four string units SU0 to SU3. Each string unit SU includes a plurality of NAND strings 213.

Each of the NAND strings 213 includes, for example, 64 memory cell transistors MT (MT0 to MT63), and select transistors ST1 and ST2. Each memory cell transistor MT includes a control gate and a charge storage layer, and stores data in a non-volatile manner. The 64 memory cell transistors MT (MT0 to MT63) are connected in series between the source of the select transistor ST1 and the drain of the select transistor ST2. The memory cell transistors MT may be a metal-oxide-nitride-oxide-semiconductor (MONOS) type using an insulating film for a charge storage layer or may be a floating gate (FG) type using a conductive film for the charge storage layer. The number of memory cell transistors MT in the NAND string 213 is not limited to 64.

The gate of the select transistor ST1 in each of the string units SU0 to SU3 is connected to each of select gate lines SGD0 to SGD3. The gate of the select transistor ST2 in each of the string units SU0 to SU3 can be connected in common to the select gate lines SGS. The gate of the select transistor ST2 in each of the string units SU0 to SU3 may be connected to a different select gate line for each string unit SU. The control gates of the memory cell transistors MT0 to MT63 in the same block BLK are connected to word lines WL0 to WL63, respectively.

The drain of the select transistor ST1 of each NAND string 213 in a string unit SU are connected to bit lines BL (BL0 to BL (L−1), where L is a natural number of 2 or more) which are different from each other. Also, the bit lines BL connect to one NAND string 213 in each string unit SU across the plurality of blocks BLK. Furthermore, the sources of the select transistors ST2 are connected in common to a source line SL.

That is, the string unit SU is a set of NAND strings 213 which are connected to different bit lines BL but connected to the same select gate line SGD. The block BLK is a set of string units SU sharing the same word lines WL. The memory cell array 211 is a set of a plurality of blocks BLK sharing the same bit lines BL.

The program operation and the sense operation by the peripheral circuit 210 may be simultaneously executed for the memory cell transistors MT connected to the same word line WL in a string unit SU. A collection of data corresponding to program operation or a read operation performed for one word line WL in one string unit SU is referred to as a "page" or a "page unit" of data.

The erase operation by the peripheral circuit 210 is executed in units of a block BLK. That is, all data stored in one block BLK can be erased collectively in one operation.

Figure 4:
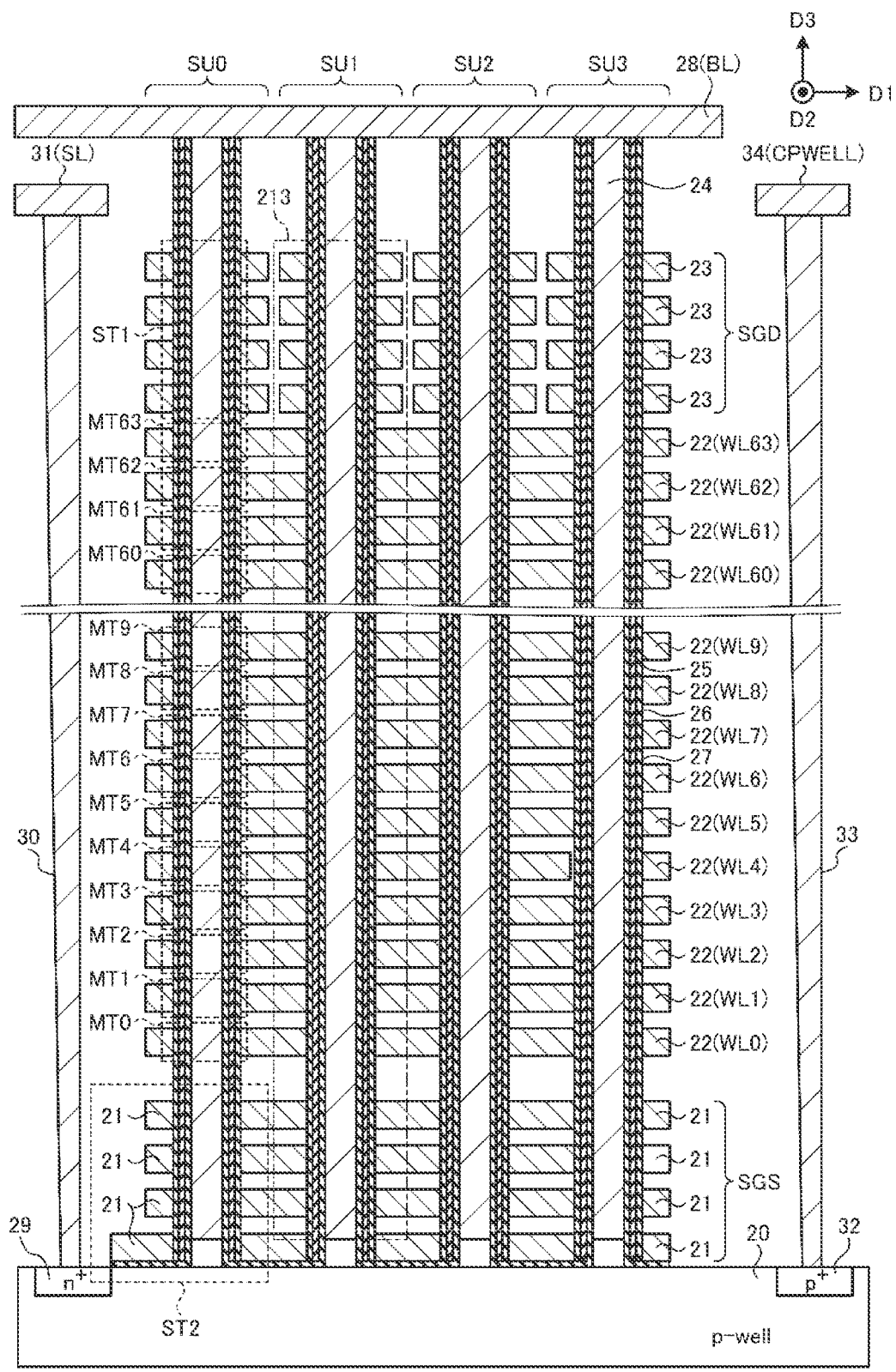
FIG. 4 is a cross-sectional view of a partial region of a block according to an embodiment.

FIG. 4 is a cross-sectional view of a partial region of the block BLK according to the embodiment. As shown in the drawing, a plurality of NAND strings 213 are formed on a p-type well region 20 (semiconductor substrate). That is, above the well region 20, for example, four wiring layers 21 functioning as the select gate line SGS, sixty-four (64) wiring layers 22 functioning as the word lines WL0 to WL63, and, for example, four wiring layers 23 functioning as the select gate line SGD are stacked. An insulating film is between the stacked wiring layers.

A pillar-shaped conductor 24 is formed to reach the well region 20 by passing through the wiring layers 23, 22, and 21. A gate insulating film 25, a charge storage layer 26 (an insulating film or a conductive film depending on device type), and a block insulating film 27 are formed on the side surface of the conductor 24 for forming the memory cell transistor MT and the select transistors ST1 and ST2. The conductor 24 functions as a current path (channel) for the NAND string 213 and is a region in which the channel of each transistor is formed. The upper end of the conductor 24 is connected to a metal wiring layer 28 functioning as the bit line BL.

An n$^+$-type impurity diffusion layer 29 is formed in the surface region of the well region 20. A contact plug 30 is formed on the diffusion layer 29, and the contact plug 30 is connected to a metal wiring layer 31 functioning as the source line SL. A p$^+$-type impurity diffusion layer 32 is formed in the surface region of the well region 20. A contact plug 33 is formed on the diffusion layer 32, and the contact plug 33 is connected to a metal wiring layer 34 functioning as a well wiring CPWELL. The well wiring CPWELL is wiring for applying a voltage to the conductor 24 through the well region 20.

A plurality of the configurations described above are arranged in a second direction D2 parallel to the semiconductor substrate, and a set of the plurality of NAND strings 213 arranged in the second direction D2 form the string unit SU.

The configurations shown in FIGS. 2 to 4 are examples. The configuration of memory cell array 211 is not limited to the configuration described above. For example, the memory cell array 211 may have a configuration in which the NAND strings 213 are two-dimensionally arranged.

Hereinafter, the memory cell transistor MT will simply be referred to as a memory cell.

Figure 5:
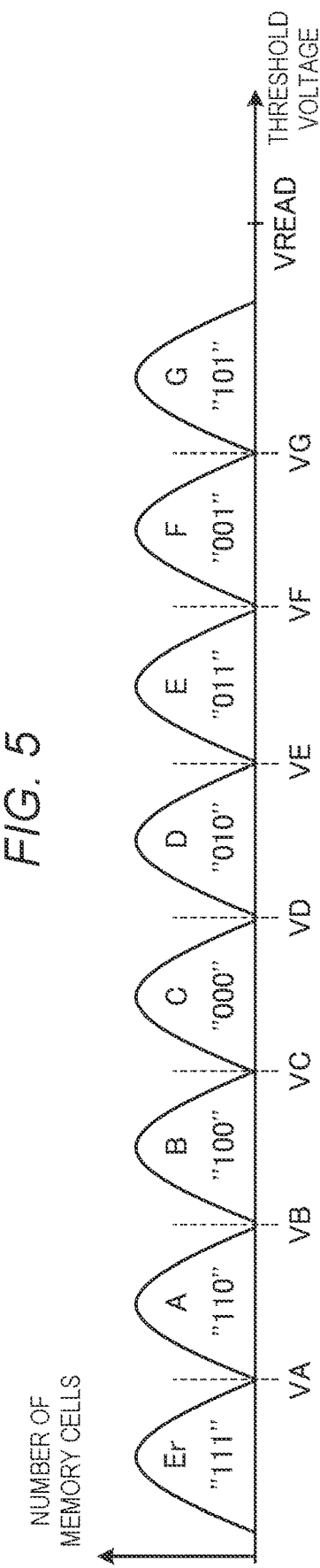
FIG. 5 is a schematic diagram of threshold voltage distributions of memory cells according to an embodiment.

FIG. 5 is a schematic diagram showing an example of a distribution of threshold voltages (as measured) for a plurality of memory cells according to the embodiment. In in FIG. 5, the vertical axis indicates the number (count) of memory cells, and the horizontal axis indicates a threshold voltage (Vth) value. Here, as an example, as a method for storing data in each memory cell, a method called TLC (triple-level cell) is applied. According to the TLC method, each memory cell can store 3-bit data.

When TLC is used, the range of the threshold voltage is divided into eight ranges. The eight ranges, in ascending order of threshold voltage, are called an "Er" state, an "A" state, a "B" state, a "C" state, a "D" state, an "E" state, an "F" state, and a "G" state. When a program operation is performed, the threshold voltage of each memory cell is changed by the peripheral circuit 210 to be in any one of the "Er" state, the "A" state, the "B" state, the "C" state, the "D" state, the "E" state, the "F" state, and the "G" state according to intended data values to be stored. When plotting the number of memory cells at these corresponding threshold voltages, the distribution of the threshold voltages of the memory cells ideally forms eight distinct lobes belonging to the different states as shown in FIG. 5.

Each of these eight states corresponds to different 3-bit data values. In one example, the "Er" state corresponds to "111", the "A" state corresponds to "110", the "B" state corresponds to "100", the "C" state corresponds to "000", the "D" state corresponds to "010", the "E" state corresponds to "011", the "F" state corresponds to "001", and the "G" state corresponds to "101". As described above, each memory cell can store data corresponding to its set threshold voltage.

In the 3-bit data value stored in each memory cell, the first digit may be called an upper bit, the middle digit may be called a middle bit, and the last digit may be called a lower bit. A set of lower bits written to a word line may be called a lower page. A set of middle bits written to a word line may be called a middle page. A set of upper bits written to a word line may be called an upper page.

The threshold voltage of a memory cell is lowered to the "Er" state by the erase operation. The threshold voltage is maintained at the "Er" state or changed to any of the "A" state, the "B" state, the "C" state, the "D" state, the "E" state, the "F" state, and "G" state by a program operation.

Specifically, in a program operation, the peripheral circuit 210 selects the bit line BL corresponding to a column address. The peripheral circuit 210 sets the voltage of the selected bit line BL to zero. The peripheral circuit 210 selects a word line WL corresponding to a row address and applies a programming pulse to the selected word line WL. Then, electrons are injected into the charge storage layer of the memory cell located at the intersection of the selected bit line BL and the selected word line WL, and as a result, the threshold voltage of the memory cell increases. The peripheral circuit 210 checks whether the threshold voltage has reached a target state corresponding to write data by sensing the data corresponding to the threshold voltage at a predetermined timing. The peripheral circuit 210 continues applying a program pulse until the threshold voltage of the memory cell reaches the target state.

Hereinafter, a memory cell whose threshold voltage has been set to a certain state by a program operation may be referred to as a memory cell belonging to that state.

A determination (sensing) voltage for determining data is at a position between two adjacent states. For example, as illustrated in FIG. 5, a determination voltage VA is set between the "Er" state and the "A" state, a determination voltage VB is set between the "A" state and the "B" state, a determination voltage VC is set between the "B" state and the "C" state, a determination voltage VD is set between the "C" state and the "D" state, a determination voltage VE is set between the "D" state and the "E" state, a determination voltage VF is set between the "E" state and the "F" state, and a determination voltage VG is set between the "F" state and the "G" state.

In the sense operation, the peripheral circuit 210 applies a plurality o of determination voltages to the selected word line WL, and the sense amplifier 214 determines whether, when each determination voltage is applied, the memory cell is in a conducting state (in other words, on state) or a non-conducting state (in other words, an off state) for each memory cell. The peripheral circuit 210 applies a voltage VREAD higher than the range of the "G" state to unselected word lines WL in order to make the memory cells connected to the unselected word lines WL enter the conducting state regardless of the data state to which the memory cells belong. The sense amplifier 214 determines the data associated with the state to which the memory cell belongs by a logical operation using the determination result obtained for each applied determination voltage.

The operation of transferring data to the memory cell array 211 under the control of the outside of the memory chip CP, for example, the memory controller MC or the bridge chip BC, is referred to as a write operation. The write operation includes a data-in operation of transferring the write data from the outside to the data latch 212 and a program operation of writing the write data stored in the data latch 212 to the memory cell array 211.

Also, an operation of outputting the data stored in the memory cell array 211 to the memory chip CP under external control, for example, by the memory controller MC or the bridge chip BC, is referred to as the read operation. The read operation includes the sense operation of transferring read data from the memory cell array 211 to the data latch 212 and a data output operation of outputting the read data from the data latch 212 to the outside.

Figure 6:
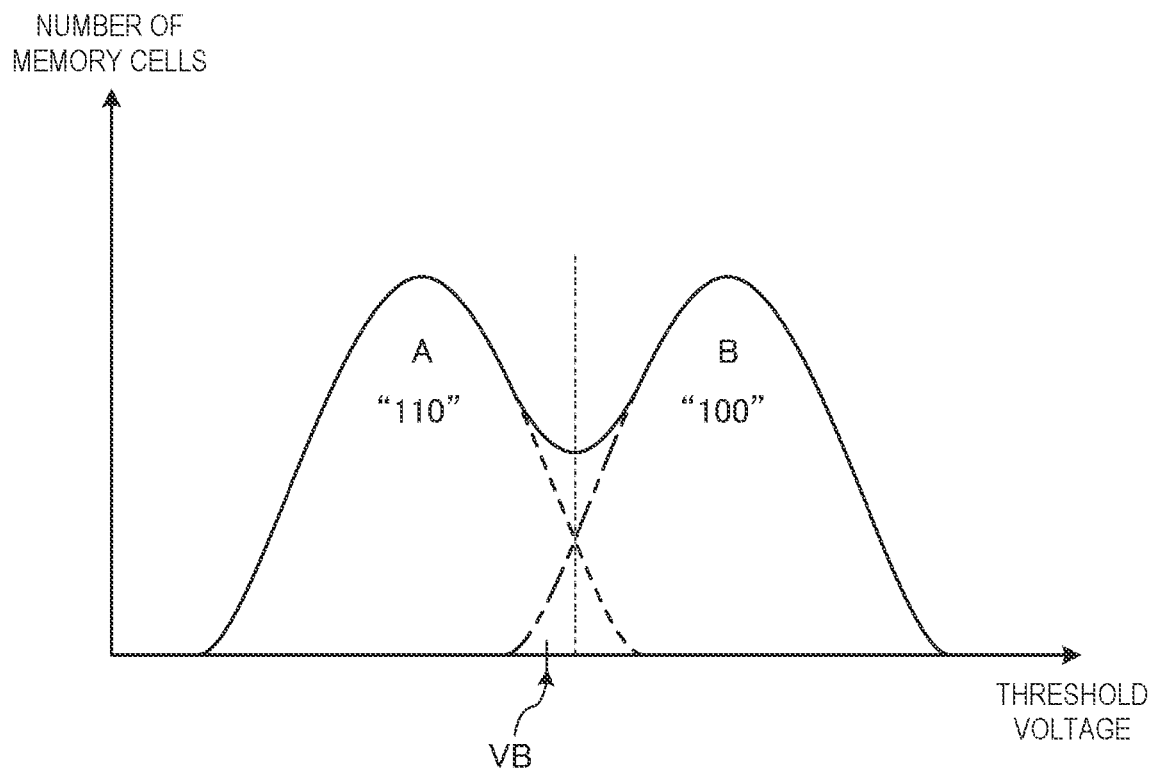
FIG. 6 is a diagram showing another example of threshold voltage distributions of memory cells according to an embodiment.

FIG. 5 illustrates a case where the memory cells form eight lobes that do not overlap each other. However, the threshold voltage of a memory cell may change due to various factors. For example, the threshold voltage of the memory cells tends to change according to time elapsed since the completion of the program operation. The rate of the change in the threshold voltage of the memory cell is typically fastest immediately after the program operation is completed, and then slows down with the elapse of time. A memory cell for which the number erase operations and program operations is large is also more likely to experience a change in the previously written threshold voltage. Also, the change in the threshold voltage of a memory cell may be affected by not only the time elapsed since the completion of the program operation, but also the sense operation on the memory cell, the sense operation on the adjacent memory cells, the temperature at the time of access, and the like. Since the threshold voltage of the memory cell may change, some adjacent lobes may actually partially overlap each other during the sense operation. FIG. 6 is a diagram showing another example of the threshold voltages as measured for the memory cells according to the embodiment. Here, the distribution of memory cells belonging to either the "A" state or the "B" state is shown in the drawing for ease of explanation. A solid line indicates the distribution of memory cells belonging to either the "A" state or the "B" state. A dashed line indicates the lobe in the "A" state and an alternate long and short dashed line indicates the lobe in the "B" state. In the example of the drawing, a portion of the "A" state lobe overlaps with a portion of the "B" state lobe. In other words, the maximum value of the threshold voltage of the memory cell notionally belonging to the "A" state now exceeds the determination voltage VB, and the minimum value of the threshold voltage of the memory cell notionally belonging to the "B" state is now below the determination voltage VB. When a memory cell notionally belonging to the "A" state but having a threshold voltage higher than the determination voltage VB is read, the memory cell will be recognized as belonging to the "B" state. That is, data programmed as "110" is now read as "100". When a memory cell notionally belonging to the "B" state but having a threshold voltage lower than the determination voltage VB is read, the memory cell will be recognized as belonging to the "A" state. That is, data programmed as "100" will be read as "110".

As described above, the data read by the sense operation may change from the value at the time of the program operation due to the change in the threshold voltage as programed. The memory controller MC responds to the change in the data and the threshold voltage by error correction and shift of the determination voltage. Specifically, the memory controller MC executes an error correction process on the read data. However, when the error correction fails, the memory controller MC may change some or all of the set of values of the determination voltages VA, VB, VC, VD, VE, VF, and VG and attempt the read operation again. A case where the error correction fails means that data as written before the change cannot be restored from the data as read after the change. The case where the error correction fails means that an error bit included in the read data cannot be corrected. A case where the error correction is successful means that all error bits included in the read data are corrected. The memory controller MC performs a retry read until the error correction is successful or the number of times that the read operation has been repeated reaches a predetermined number. In other words, the memory controller MC repeats the read operation while changing some or all of the determination voltage values until the error correction is successful or the number of times that the read operation is repeatedly executed reaches the predetermined number. A read operation with a changing of determination voltage values is referred to as a shift read operation.

A patrol read operation is executed in the memory system SYS. The patrol read operation is a read operation executed for the purpose of identifying in advance (of a normal read operation) a set of determination voltage values for which the error correction will likely be successful, in order to increase the probability of successful error correction during a subsequent read operation such as in response to a read request from the host HS. The patrol read operation is performed for the memory chip CP without a request to do so from the host HS. The memory controller MC executes the patrol read operation at predetermined time intervals or the like.

In the patrol read operation, the read operation is performed on one or more unit regions in which data has been stored. In this specification, the unit region is a unit of storage region for which a set of determination voltage values is used. Here, as an example, it is assumed that the unit region is a block BLK.

In the patrol read operation, the memory controller MC identifies (learns) the set of determination voltage values permitting successful error correction for each block BLK. The memory controller MC uses the set of determination voltage values obtained by learning when later executing a read operation in response to the request from the host HS.

Hereinafter, a read operation for reading data requested by the host HS will be referred to as a host read operation. Also, a read operation executed on one block BLK as part of the patrol read operation is referred to as a unit read operation. The unit read operation is an example of a first read operation.

The blocks BLK may be in one of a plurality of states including an open block, an active block, and a free block.

The open block is a partially written or unwritten block BLK. In other words, the open block is a block BLK in which a region where data may still be written remains.

The active block is a block BLK for which the write operation has been completed. The active block is also a block BLK that cannot yet be reused. A block BLK in which valid data is stored and for which the write operation is fully completed is managed as an active block. Reusing in this context means transitioning to the open block via a free block.

The free block is a block BLK in which no valid data is stored, but invalidated data is stored in the free block. The free block is also called a reusable block BLK.

For example, after data of one full block BLK is written to an open block, the open block transitions to being managed as an active block. The state of data stored in the active block is either a valid state or an invalid state.

When, certain data (first data) has been stored in an active block, a logical address having the same value as a logical address specified when the first data was sent is specified and second data is sent from the host HS, the memory controller MC writes the second data to an empty page in an open block or a free block, and manages the first data stored in the active block as invalid data. Therefore, valid data and invalid data may be mixed in the active block.

The active block transitions to the free block by a transcription process. The transcription process is a process for transcribing the valid data stored in the active block to an open block or a free block, and invalidating all data stored in the active block. As a result, the active block transitions to being managed as a free block. The transcription process is also called garbage collection (also referred to as "compaction").

The free block transitions to being managed as an open block after any stored data (that is, the now invalid data) is erased.

In the embodiment, when there is a block BLK in which data is stored, the block BLK is assumed to be a target for the patrol read operation regardless of whether valid data is stored in the block BLK or not. A block BLK (for example, a free block) in which only invalid data is stored may be excluded from the targets of the patrol read operation in some examples.

Figure 7:
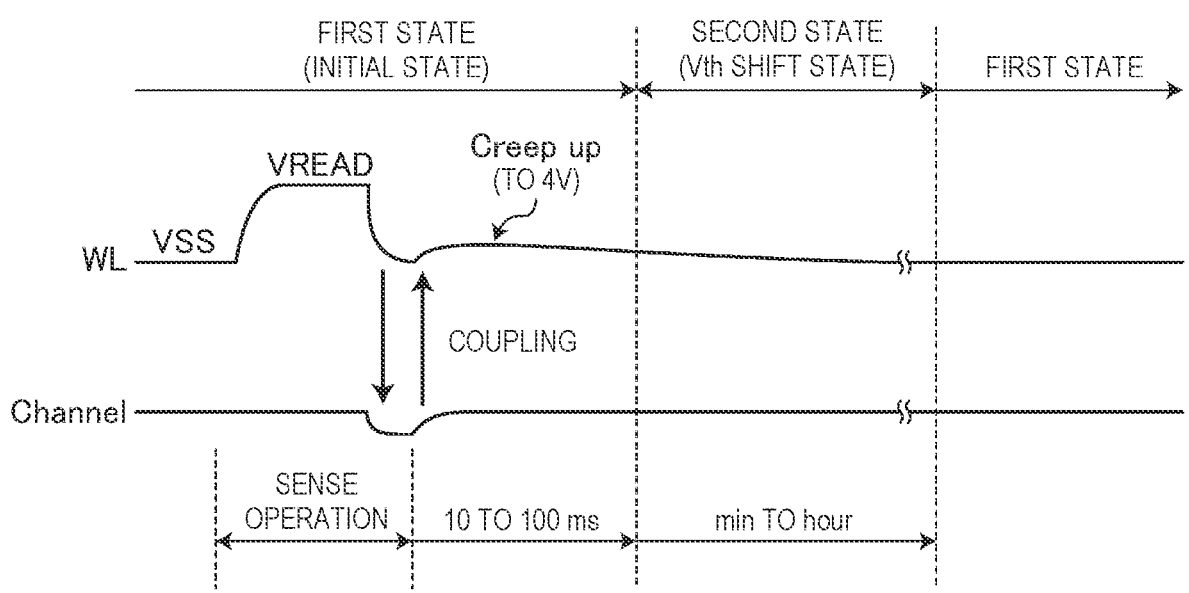
FIG. 7 is a diagram showing an example of waveforms on a word line and a channel of a NAND string during a sense operation.

As shown in FIG. 4, the channels of the memory cell transistors MT provided in the NAND string 213 have a structure sharing the conductor 24. In a NAND flash memory with such a structure, a phenomenon such as shown in FIG. 7 may occur. FIG. 7 shows an example of waveforms on the word line WL and the channel of the NAND string 213 during the sense operation.

As shown in FIG. 7, when the sense operation is executed, the peripheral circuit 210 applies the voltage VREAD to the unselected word lines WL of the block BLK (referred to as a target block BLK) including the word lines WL on which the sense operation is executed. Then, when the read data is confirmed, the peripheral circuit 210 lowers the voltage of the unselected word lines WL to the ground voltage VSS. At this time, when the voltage of the word line WL becomes equal to or lower than the threshold voltage of the memory cell, the memory cell becomes the off state. Then, when the voltage of the word line WL is further lowered, the channel voltage of the NAND string 213 is lowered from the ground voltage to a negative voltage due to coupling with the word line WL. After the sense operation, the target block BLK is not selected, resulting in the word line WL being in a floating state. In this state, when a negative channel voltage returns to the ground voltage with the elapse of time, the voltage of the word line WL rises to, for example, about 4 V due to coupling with the channel of the NAND string 213. This phenomenon is labeled as "Creep up" in FIG. 7.

In the block BLK in a state in which the voltage of the word line WL has been raised by creep up, a voltage difference occurs between the control gate channels of the memory cells in the block BLK, so that the threshold voltage of each memory cell may be shifted with the elapse of time (for example, 10 to 100 ms) after the sense operation.

Then, the voltage of the word line WL, which rises due to the creep up, returns to the ground voltage with the elapse of time as shown in FIG. 7. When further time (for example, several minutes to several hours) elapses after the fluctuation of the voltage of the word line WL due to the creep up subsides, the increased threshold voltage of the memory cell returns to an original state. As above, the memory cell transistor MT may take two states including a first state in which the threshold voltage is in an initial state and a second state in which the threshold voltage is shifted under the influence of the creep up. On the other hand, since the determination voltage can be selected to be optimized for, for example, the second state, it is preferable to maintain the memory cell in the second state during the read operation in a NAND flash memory in which creep up may occur.

Therefore, in the memory system SYS, a dummy read operation is executed on one or more blocks BLK which are the target of the patrol read operation. The dummy read operation includes at least the sense operation. The dummy read operation may not include the data output operation. That is, the dummy read operation may include only the sense operation. Here, as an example, the dummy read operation does not include the data output operation and includes just the sense operation. The dummy read operation is an example of the second read operation.

For example, the dummy read operation is executed on the block BLK including the memory cells in the first state. Then, the creep up occurs in the block BLK on which the dummy read operation has been executed, and the memory cells transition from the first state to the second state. Then, before the memory cell transitions from the second state back to the first state due to the elapse of time, the unit read operation on the block BLK is executed.

When four semiconductor storage devices 1 are commonly connected to the host channel HCH as shown in FIG. 1, it may be necessary that the memory controller MC serially performs the patrol read operation in time (more precisely, a unit read operation of each block BLK) on each of the four semiconductor storage devices 1.

Here, a technique to be compared with the embodiment will be described. The technique to be compared with the embodiment is referred to as a comparative example. According to the comparative example, immediately before the memory controller performs the patrol read operation on each semiconductor storage device, the memory controller commands a dummy read operation for each block BLK that is a target of the patrol read operation for each semiconductor storage device. In such a case, it is necessary that the memory controller serially commands in time not only the unit read operation but also the dummy read operation for all blocks BLK which are targets of the patrol read operation. Therefore, the patrol read operation including the command by the memory controller, more precisely, the preliminary dummy read operation and the patrol read operation take a lot of time.

In the embodiment, the bridge chip BC is configured to generate a dummy read operation command and transfer the dummy read operation command to the memory chip CP without receiving a dummy read operation command from the memory controller MC. With this configuration, the four semiconductor storage devices 1 are capable of controlling the dummy read operation in parallel (simultaneously in time), and each of the four semiconductor storage devices 1 is capable of giving the dummy read operation command to the memory chip CP even when the host channel HCH is occupied by data transfer via one of the other semiconductor storage device 1. Therefore, it is possible to reduce the time required for the patrol read operation, more precisely, the preliminary dummy read operation and the patrol read operation. The details of the configuration of the bridge chip BC for generating the dummy read operation command will be described below.

Figure 8:
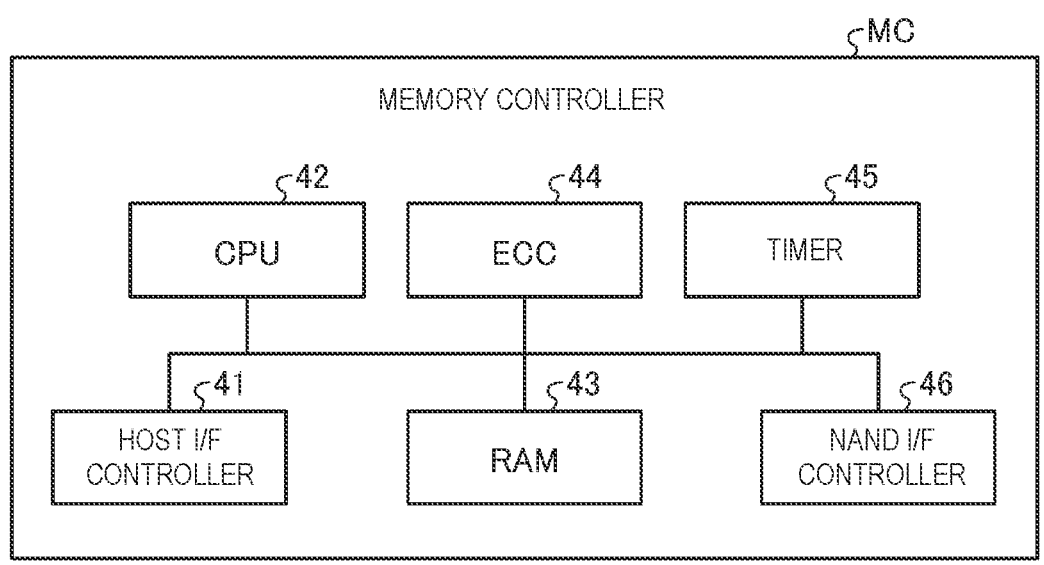
FIG. 8 is a diagram of a memory controller according to an embodiment.

FIG. 8 is a diagram showing an example of a hardware configuration of the memory controller MC according to the embodiment.

The memory controller MC includes a host interface (I/F) controller 41, a Central Processing Unit (CPU) 42, a Random Access Memory (RAM) 43, an Error Checking and Correcting circuit (ECC) 44, a timer 45, and a NAND interface (I/F) controller 46.

The memory controller MC may be configured as, for example, a System-On-a-Chip (SoC). The memory controller MC may be configured with a plurality of chips. The memory controller MC may comprise or include a Field-Programmable Gate Array (FPGA) or an Application Specific Integrated Circuit (ASIC). Each function of the memory controller MC may be implemented by software, hardware, or a combination thereof. The RAM 43 may be disposed outside the memory controller MC in some examples.

The RAM 43 is a memory used as a buffer or a work area for the CPU 42. The type of the memory that constitutes the RAM 43 is not limited to a specific type. The RAM 43 can be, for example, a Dynamic Random Access Memory (DRAM), a Static Random Access Memory (SRAM), or a combination thereof.

A host I/F controller 41 executes the control of a communication interface with the host HS. The host I/F controller 41 executes communication with the host HS under the control of the CPU 42. The NAND I/F controller 46 executes communication with one or more memory chips CP under the control of the CPU 42.

In the embodiment, the bridge chip BC is interposed between the NAND I/F controller 46 and the plurality of memory chips CP. The bridge chip BC processes and transfers electrical signals (for example, commands, addresses, or data) received from the NAND I/F controller 46 to any of the memory chips CP connected to the bridge chip BC without or with change, or transfers electrical signals (for example, data) received from any of the memory chips CP connected to the bridge chip BC to the NAND I/F controller 46. The NAND I/F controller 46 is configured to be able to communicate with the one or more memory chips CP even when the one or more memory chips CP are connected to the NAND I/F controller 46 without the bridge chip BC.

The ECC 44 encodes the data transferred to the semiconductor storage device 1 using an error correction code. Also, the ECC 44 executes decoding for data received from the semiconductor storage device 1, thereby detecting and correcting bit errors included in the data.

An encoding method used by the ECC 44 is not limited to a specific method. In one example, Low Density Parity Check (LDPC) may be adopted as the encoding method.

A timer 45 measures the elapse of time. The timer 45 may be omitted and the measurement of the elapse of time may be executed by the CPU 42.

The CPU 42 controls the host I/F controller 41, the RAM 43, the ECC 44, the timer 45, and the NAND I/F controller 46. The CPU 42 implements control of the memory system SYS using the various elements described above by executing a firmware program.

In particular, in the embodiment, the CPU 42 executes the control of the patrol read operation. The CPU 42 uses the timer 45 to determine whether the timing for starting the patrol read operation arrives. More specifically, when the value of the timer 45 reaches a predetermined value (referred to as a first value), the CPU 42 determines that the time for starting the patrol read operation arrives, and starts the patrol read operation. When the patrol read operation is completed, the value of the timer 45 is reset and the timer 45 restarts the measurement of the elapse of time. The CPU 42 implements the patrol read operation at predetermined time intervals by repeating the operations.

Figure 9:
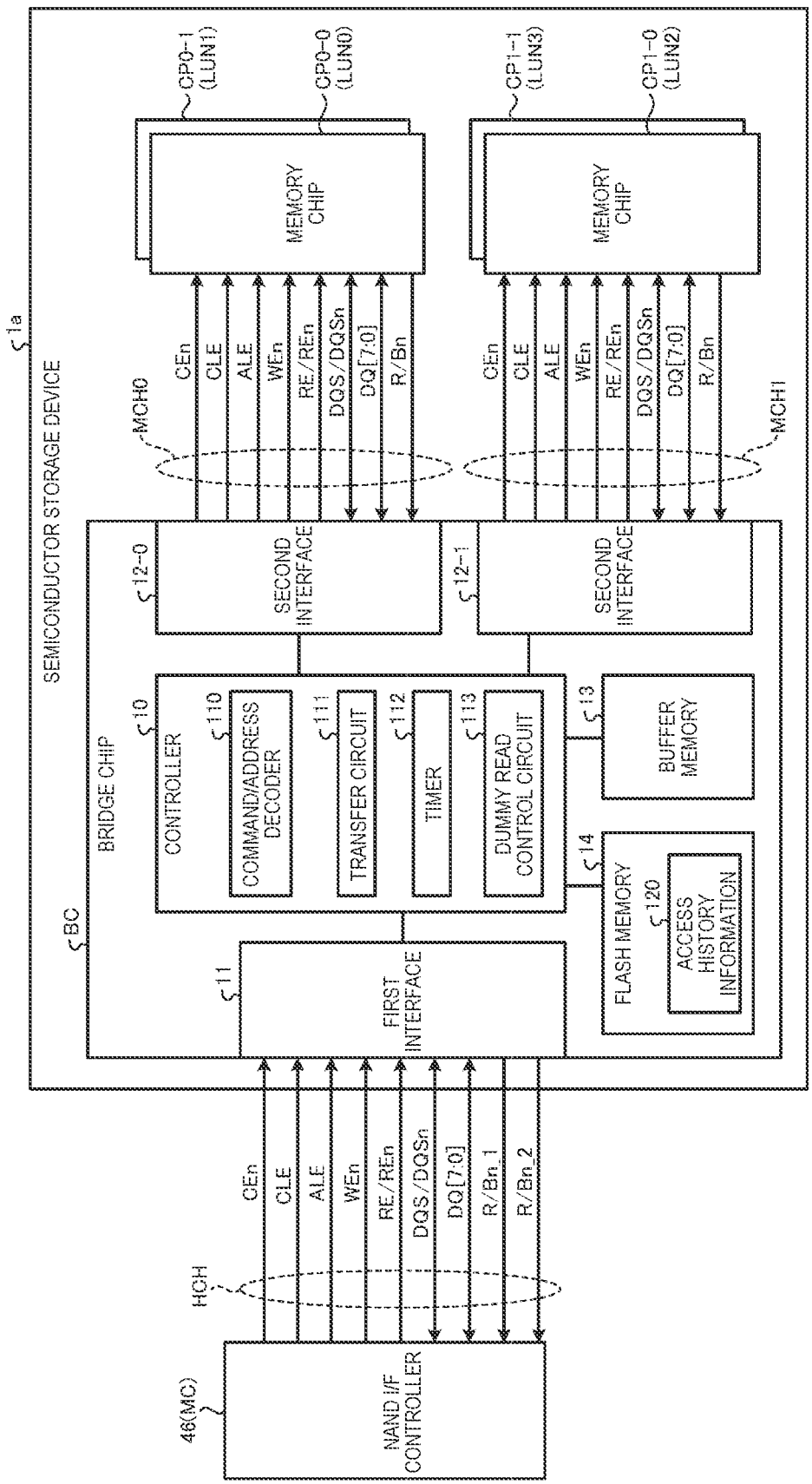
FIG. 9 is a diagram of a semiconductor storage device and a bridge chip according to an embodiment.

FIG. 9 is a diagram showing an example of a configuration of the semiconductor storage device 1 and the bridge chip BC according to the embodiment. The semiconductor storage devices 1a, 1b, 1c, and 1d have the same configuration. Here, the configuration of the semiconductor storage device 1a will be described as a representative of the semiconductor storage devices 1a, 1b, 1c, and 1d. Also, the semiconductor storage devices 1a, 1b, 1c, and 1d are connected to the host channel HCH, but the semiconductor storage devices 1b, 1c, and 1d are not shown in the drawing for simplification.

The bridge chip BC includes a controller 10, a first interface 11, two second interfaces 12, a buffer memory 13, and a flash memory 14.

The first interface 11 is a PHY circuit that communicates electrical signals with the memory controller MC (more precisely, the NAND I/F controller 46 provided in the memory controller MC) via the host channel HCH.

The host channel HCH includes a signal line for transferring a chip enable signal CEn, a signal line for transferring a command latch enable signal CLE, a signal line for transferring an address latch signal ALE, a signal line for transferring a write enable signal WEn, a signal line for transferring a read enable signal RE/REn, a signal line for transferring a data strobe signal DOS/DQSn, a signal line for transferring data signals DQ[7:0] having a predetermined bit width (here, an 8-bit width as an example), a signal line for transferring a ready-busy signal R/Bn_1, and a signal line for transferring a ready-busy signal R/Bn_2. The "n" written at the end of any symbol representing a signal indicates that the signal is operated in negative logic. Whether each signal is operated with negative logic or positive logic may be designed in an arbitrary manner.

The chip enable signal CEn is a signal for making the memory chip CP which is an access target enter an enable state. The data strobe signal DQS/DQSn is a signal instructing a counterpart device to fetch data transferred in the data signal DQ[7:0]. The data strobe signal DOS/DQSn is a differential signal including the data strobe signal DQS and the data strobe signal DQSn. The command latch enable signal CLE is a signal indicating that a data signal DQ[7:0] is a command. The address latch signal ALE is a signal indicating that the data signal DQ[7:0] is an address. The write enable signal WEn is a signal instructing the counterpart device to fetch the command or the address transferred in the data signal DQ[7:0]. The read enable signal RE/REn is a signal instructing the counterpart device to output the data signal DQ[7:0]. The read enable signal RE/REn is a differential signal including the read enable signal RE and the read enable signal REn. The ready-busy signal R/Bn_1 and the ready-busy signal R/Bn_2 are signals indicating a ready state (which is a state of waiting to receive a command) or a busy state (which is a state in which a command cannot be executed even if the command is received). The configuration of the signal line for transferring the ready-busy signal R/Bn included in the host channel HCH is not limited to the above example. For example, with regard to the ready-busy signal R/Bn, the host channel HCH may include just one signal line for transferring one ready-busy signal R/Bn generated by a wired OR connection or the like from the ready-busy signal R/Bn applied to the memory channel MCH0 and the ready-busy signal R/Bn applied to the memory channel MCH1.

Each of the memory channels MCH0 and MCH1 can communicate the same types of signals as the signal group of the host channel HCH. That is, each of the memory channels MCH0 and MCH1 includes a signal line for transferring a chip enable signal CEn, a signal line for transferring a command latch enable signal CLE, a signal line for transferring an address latch signal ALE, a signal line for transferring a write enable signal WEn, a signal line for transferring a read enable signal RE/REn, a signal line for transferring a data strobe signal DOS/DQSn, a signal line for transferring data signals DQ[7:0], a signal line for transferring a ready-busy signal R/Bn.

A second interface 12-0 of the two second interfaces 12 is a PHY circuit that communicates the electrical signals with the two memory chips CP0-0 and CP0-1 via the memory channel MCH0. A second interface 12-1 of the two second interfaces 12 is a PHY circuit that communicates the electrical signals with the two memory chips CP1-0 and CP1-1 via the memory channel MCH1.

The buffer memory 13 is used as a region for temporarily storing information (including a command, an address, or data) transferred by the controller 10 between the first interface 11 and the two second interfaces 12.

The flash memory 14 is a non-volatile memory in which management information can be stored in a non-volatile manner. Here, the management information includes access history information 120. The access history information 120 is recorded with address information indicating a unit region which is a target of the patrol read operation among a plurality of unit regions provided in the four memory chips CP0-0, CP0-1, CP1-0, and CP1-1.

As described above, in the present example, the block BLK in which data is stored can be the target of the patrol read operation regardless of whether the stored data is valid or invalid. Therefore, when the write operation is executed on a certain block BLK, the address information indicating the block BLK is recorded in the access history information 120. Then, when the erase operation is executed on a certain block BLK, the address information indicating the block BLK is erased from the access history information 120.

The recording or erasing of the address information in the access history information 120 is executed by, for example, a command/address decoder 110. Based on the command and the address received from the memory controller MC, the command/address decoder 110 identifies whether a write operation has been executed on a block or an erase operation has been executed on a block. The command/address decoder 110 then executes the recording or erasing of the address information in the access history information 120 according to the identification result.

Figure 10:
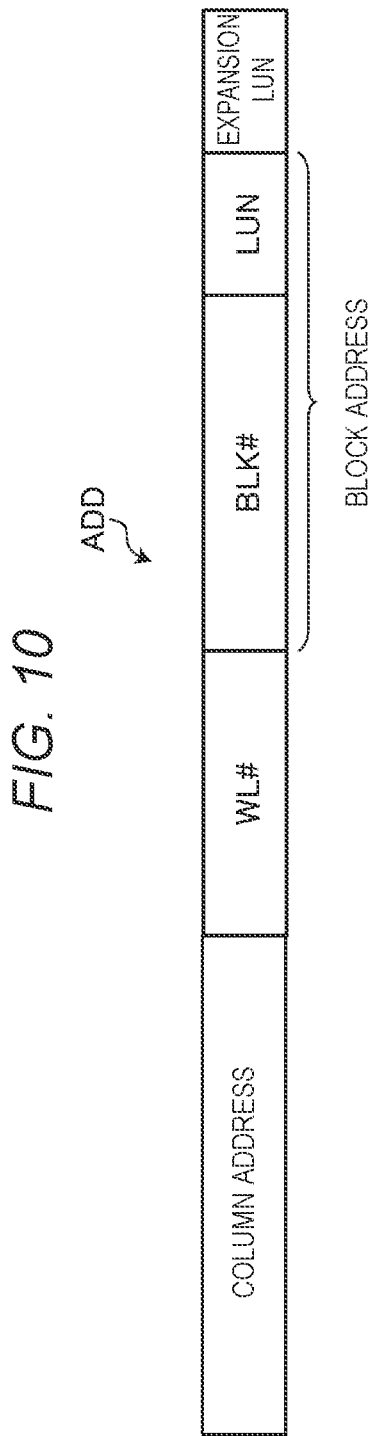
FIG. 10 is a schematic diagram showing an example of an address bit string as received from a memory controller by a bridge chip according to an embodiment.

FIG. 10 is a schematic diagram showing an example of an address bit string received by the bridge chip BC from the memory controller MC. The bridge chip BC receives a bit string for the address ADD (as shown in the drawing) together with commands instructing various operations from the memory controller MC. The column address is disposed at the first part of the bit string of the address ADD. The column address indicates a bit line BL and corresponds to a position for one page of data stored in the data latch 212. The column address is followed by a word line WL number (WL #), a block BLK number (BLK #), the LUN, and an expansion LUN. Each block BLK provided in each memory chip CP connected to the bridge chip BC can be uniquely specified by the combination of the block BLK number and the LUN. Therefore, the command/address decoder 110 records at least the block BLK number and the LUN of an address ADD received from the memory controller MC as the address information indicating the block BLK in the access history information 120. The address information recorded in the access history information 120 may include additional information other than just the block BLK number and the LUN. Hereinafter, the address information indicating a block BLK will be referred to as a block address.

The memory in which the management information including the access history information 120 is stored is not limited to the flash memory 14, and any location may be adopted. The memory in which the management information including the access history information 120 is stored need not be a non-volatile memory. The memory in which the management information including the access history information 120 is stored may be built in the controller 10.

Hereinafter, the set of information for commanding a particular operation including the command and the address will be referred to as a command sequence.

As shown in FIG. 9, the controller 10 is disposed between the first interface 11 and two second interfaces 12. The controller 10 controls the transfer of information between the first interface 11 and the two second interfaces 12 using the buffer memory 13.

The controller 10 includes a command/address decoder 110, a transfer circuit 111, a timer 112, and a dummy read control circuit 113.

The command/address decoder 110 analyzes a command sequence received from the memory controller MC via the host channel HCH. The command/address decoder 110 can generate the appropriate command sequence for a memory chip CP according to the analysis result.

Also, the command/address decoder 110 manages the access history information 120 based on the command sequences received from the memory controller MC.

The transfer circuit 111 includes pipelines that perform signal transfer as necessary between the first interface 11 and the two second interfaces 12.

Since the bridge chip BC is interposed between the NAND I/F controller 46 and the plurality of memory chips CP, the host channel HCH can perform data transfer at a higher rate than just one memory channel MCH.

For example, according to the configuration shown in FIG. 1, when the four semiconductor storage devices 1 are operated simultaneously and two memory channels MCH are simultaneously used in each semiconductor storage device 1, in other words, when eight memory channels MCH are simultaneously used in the memory system SYS, data throughput for a group of memory chips CP is maximized. In order to implement such a case, the host channel HCH should be able to perform data transfer at eight times the rate of one memory channel MCH.

When the host channel HCH performs data transfer at eight times the rate of one memory channel MCH, the transfer circuit 111 changes the rate of data transfer when performing signal transfer between the first interface 11 and the two second interfaces 12.

Specifically, the transfer circuit 111 transfers the signal received from the first interface 11 to the two second interfaces 12 according to a transfer clock whose frequency is ⅛ the frequency of the transfer clock when the signal is received from the first interface 11. Also, the transfer circuit 111 transfers the signal received from each of the second interfaces 12 to the first interface 11 with a transfer clock whose frequency is eight times the frequency of the transfer clock when the signal is received from one second interface 12.

The host channel HCH may not necessarily perform data transfer at eight times the rate of one memory channel MCH. The host channel HCH may be configured such that the rate of data transfer is variable according to the number of memory channels MCH which are to be useable or used simultaneously. In such a case, the transfer circuit 111 may be configured such that the multiplication rate and division rate of the frequency of the transfer clock are variable.

A timer 112 measures the elapse of time.

The dummy read control circuit 113 performs control to execute the dummy read operation (s) before a patrol read operation on the block BLK which is the target of the patrol read operation.

Specifically, the dummy read control circuit 113 uses the timer 112 to determine whether the time for starting the patrol read operation has arrived. More specifically, when the value of the timer 112 reaches a predetermined value (referred to as a second value), the dummy read control circuit 113 determines that the time for starting the patrol read operation arrives. For example, the second value is equal to the first value. When the value of the timer 112 reaches the second value, the dummy read control circuit 113 generates a command sequence for commanding the dummy read operation for any block BLK which is the target of the patrol read operation, and transfers the command sequence to the memory chip CP including a block BLK which is a target of the patrol read operation. When the dummy read operation of the block BLK is completed, the patrol read operation is started according to the instructions from the memory controller MC.

In this example, when the patrol 1 read operation according to an instruction from the memory controller MC is completed, the dummy read control circuit 113 resets the value of the timer 112 and restarts the measurement of the elapse of time by the timer 112. The dummy read control circuit 113 implements the dummy read operation before each patrol read operation by repeating the operation as necessary. With this configuration the dummy read control circuit 113 voluntarily instructs the memory chip CP to perform a dummy read operation based on the timer 112, the controller 10 can thus command the memory chip CP to perform a dummy read operation independently of a request (for example, a unit read command sequence) which is received from the memory controller MC.

Next, an operation of the memory system SYS according to an embodiment will be described.

Each bridge chip BC receives command sequences from the memory controller MC for commanding various operations. Based on the address included in the received command sequence (more specifically, the value of the expansion LUN included in, for example, the address), the command/address decoder 110 determines whether the destination of the command sequence is a memory chip CP connected to the bridge chip BC. When the destination of the command sequence is a memory chip CP connected to the bridge chip BC, the controller 10 transfers the received command sequence to the memory chip CP. When the destination of the command sequence is not any memory chip CP connected to the bridge chip BC, the controller 10 discards the command sequence without transferring the command sequence.

The command/address decoder 110 monitors the command type of the command sequence transferred to the memory chip CP connected to the bridge chip BC. The command/address decoder 110 can thus manage the access history information 120 according to the monitoring results.

Figure 11:
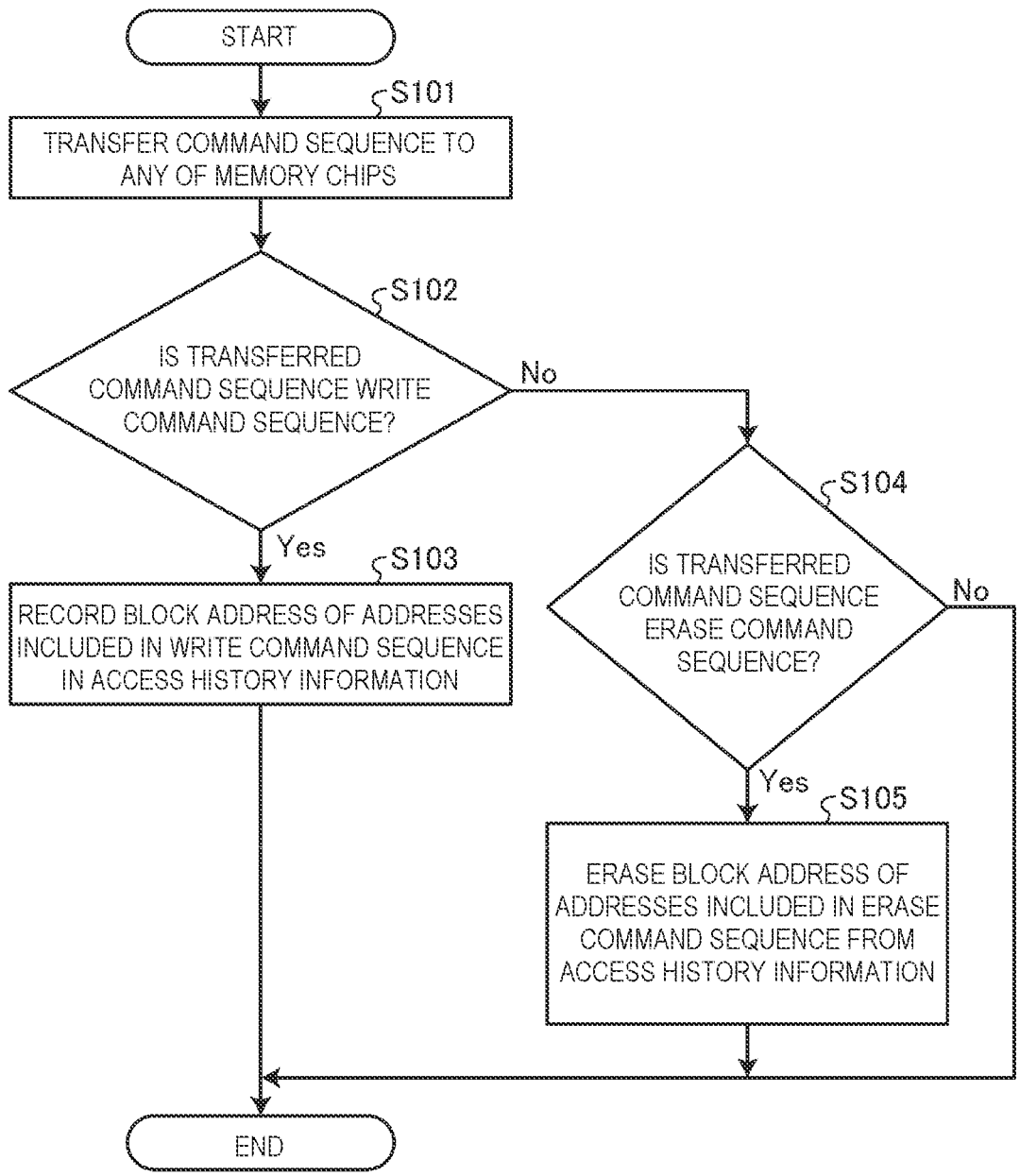
FIG. 11 is a flowchart of managing access history information by a bridge chip according to an embodiment.

FIG. 11 is a flowchart showing an example of an operation for managing the access history information 120 performed in the bridge chip BC according to the embodiment. The operation shown in the drawing is executed whenever a command sequence is transferred to a memory chip CP.

When the bridge chip BC transfers a command sequence to any of the memory chips CP connected to the bridge chip BC (S101), the command/address decoder 110 determines whether the transferred command sequence is a write command sequence for commanding the write operation (S102). When the transferred command sequence is a write command sequence (S102: Yes), the command/address decoder 110 records the block address of the addresses included in the write command sequence in the access history information 120 (S103). When the relevant block address is completely recorded in the access history information 120, the command/address decoder 110 skips the process in S103.

When the transferred command sequence is not a write command sequence (S102: No), the command/address decoder 110 next determines whether the transferred command sequence is an erase command sequence for commanding an erase operation (S104). When the transferred command sequence is an erase command sequence (S104: Yes), the command/address decoder 110 erases the block address of the addresses included in the erase command sequence from the access history information 120 (S105).

After S103, if the transferred command sequence is not an erase command sequence (S104: No), or after S105, the operation of managing the access history information 120 by the bridge chip BC ends.

The memory controller MC starts the patrol read operation at predetermined time intervals by using the timer 45. In the patrol read operation, the memory controller MC transfers a unit read command sequence, which is a command sequence for commanding a unit read operation, to the bridge chip BC for each block BLK in which data is presently stored.

The bridge chip BC uses the timer 112 to identify the arrival of the time for starting the patrol read operation. The bridge chip BC executes the dummy read operation for all blocks BLK which are targets of the patrol read operation in the memory chip CP connected to the bridge chip BC at a time before receiving the unit read command sequence from the memory controller MC. Thereafter, the bridge chip BC starts transferring the unit read command sequence received from the memory controller MC.

Figure 12:
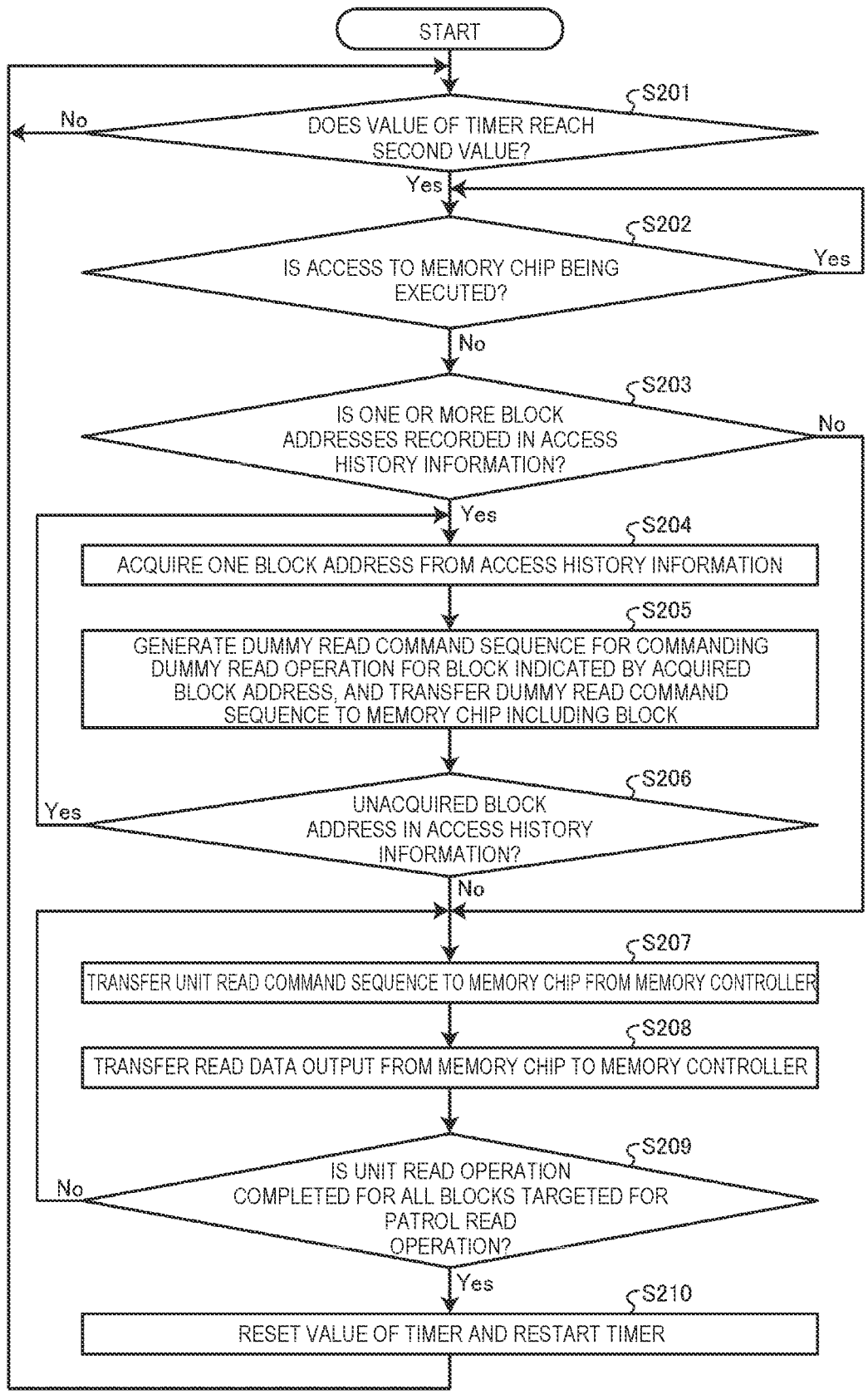
FIG. 12 is a flowchart showing a series of operations for processing a unit read command sequence by a bridge chip according to an embodiment.

FIG. 12 is a flowchart showing an example of an operation of the bridge chip BC according to an embodiment when the time for starting the patrol read operation arrives.

The dummy read control circuit 113 resets the value of the timer 112 and restarts the timer 112 after the unit read operation is completed for all blocks which are targets of the patrol read operation (refer to S210). The dummy read control circuit 113 first determines whether the value of the timer 112 reaches the second value (S201). The second value corresponds to the interval of execution of the patrol read operation. For example, in the memory controller MC, when the memory controller MC starts the patrol read operation whenever the value of the timer 45 reaches the first value, a value which is equal to the first value may be used as the second value.

When the value of the timer 112 reaches the second value (S201: Yes), the dummy read control circuit 113 determines whether access to any memory chip CP connected to the bridge chip BC having the dummy read control circuit 113 is presently being executed (S202). In S202, it is determined whether an access operation different from the unit read operation and the dummy read operation is being executed for any memory chip CP. The access operation different from the unit read operation and the dummy read operation includes, for example, access based on a request from the host HS, access as part of garbage collection, and the like.

Based on the address included in the received command sequence (more specifically, the value of the expansion LUN included in the address), the command/address decoder 110 determines whether the destination of the command sequence is a memory chip CP connected to the bridge chip BC. Then, when the destination of the command sequence is a memory chip CP connected to the bridge chip BC, the controller 10 transfers the received command sequence to the memory chip CP. When the operation according to the command sequence transferred to the memory chip CP is not completed, the dummy read control circuit 113 determines that the access to the memory chip CP is being executed. When the operation corresponding to the command sequence transferred to the memory chip CP is completed and, thereafter, the command sequence is not transferred yet, the dummy read control circuit 113 determines that the access to the memory chip CP is not being executed.

When the access to the memory chip CP is being executed (S202: Yes), the dummy read control circuit 113 executes the determination process in S202 again.

If the access to the memory chip CP is not being executed (S202: No), the dummy read control circuit 113 determines whether one or more block addresses are recorded in the access history information 120 (S203).

When one or more block addresses are recorded in the access history information 120 (S203: Yes), the dummy read control circuit 113 acquires one block address from the access history information 120 (S204). Then, the dummy read control circuit 113 generates a dummy read command sequence for commanding the dummy read operation for the block BLK indicated by the acquired block address, and transfers the dummy read command sequence to the memory chip CP including the block BLK (S205).

Figure 13:
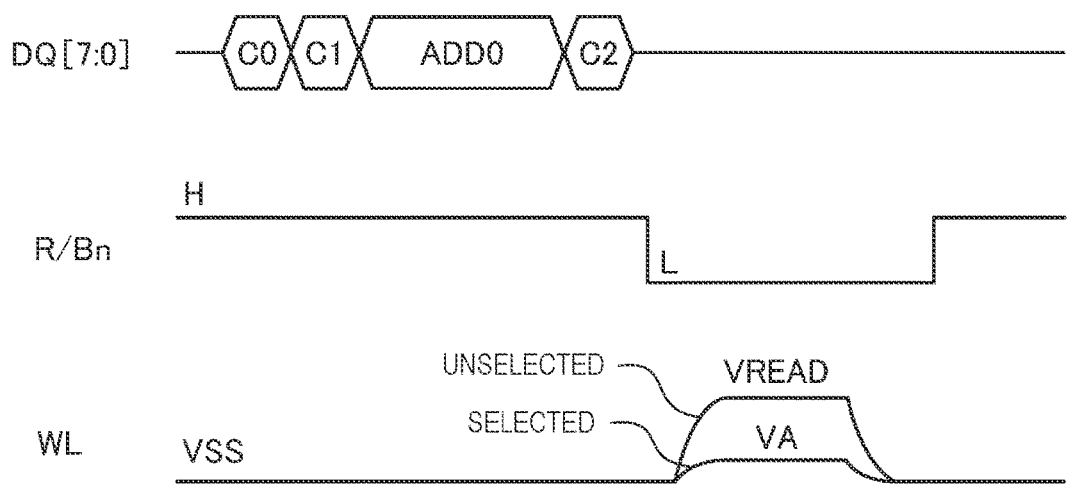
FIG. 13 is a schematic diagram of a dummy read command sequence according to an embodiment.

FIG. 13 is a schematic diagram showing an example of the dummy read command sequence according to the embodiment. FIG. 13 shows the data signal DQ[7:0], the ready-busy signal R/Bn, and the voltage waveform for the word line WL in the block BLK where the dummy read operation is to be executed.

In the example shown in FIG. 13, the dummy read command sequence includes a command C0, a command C1, an address ADD0, and a command C2.

The command C0 is a command notifying that the following command C1, the address ADD0, and the command C2 are sequences for a dummy read operation. The command C1 is a command for announcing the input of an address for the sense operation, and the command C2 is a command for commanding the start of the sense operation. The address ADD0 is, for example, address information having the same configuration as the address ADD shown in FIG. 10. The address ADD0 includes information indicating the word line WL selected from the target block BLK for the dummy read operation.

In the block BLK which is the target of the dummy read operation, the sense operation of the memory cells connected to the word line WL indicated by the address ADD0 starts according to the command C2. Specifically, the voltage of the word line WL is raised from the ground voltage VSS. A predetermined determination voltage (determination voltage VA in the example) is applied to the selected word line WL. The voltage VREAD is applied to unselected word lines WL, that is, word lines WL other than the selected word line WL in the same block BLK with the selected word line WL.

After the predetermined determination voltage or the voltage VREAD is fully applied to the word lines WL, the voltage of the word line WL returns to the ground voltage VSS.

Although "creep up" also occurs in the selected word line WL and the unselected word lines WL due to the sense operation, the "creep up" phenomenon is not specifically depicted in FIG. 13.

The ready-busy signal R/Bn is maintained in an inactive state ("H" state in the example) before the sense operation is executed. Then, the ready-busy signal R/Bn is maintained in an active state ("L" state in the example) for a period during which the sense operation is being executed, and returns to the inactive state when the sense operation is completed. When the command C2 is transferred, the dummy read control circuit 113 can know that the dummy read operation for one block BLK has been completed by detecting that the ready-busy signal R/Bn transitions from the inactive state to the active state and, thereafter, the ready-busy signal R/Bn transitions from the active state to the inactive state.

Referring again to FIG. 12.

The dummy read control circuit 113 determines whether there is still an unacquired block address in the access history information 120 (S206). When there is still an unacquired block address (S206: Yes), the control transitions to S204. The dummy read control circuit 113 acquires one block address from the unacquired block addresses in S204.

When there is no unacquired block address left (S206: No) or no block address was recorded in the access history information 120 (S203: No), the controller 10 executes transfer of the unit read command sequence received from the memory controller MC to the memory chip CP (S207). The controller 10 transfers the read data, which is output by the memory chip CP according to the unit read command sequence, to the memory controller MC (S208).

For example, the dummy read control circuit 113 maintains the ready-busy signals R/Bn_1 and R/Bn_2 in a busy state until No is determined in the determination process of S203 or S206 after the process of S201, thereby preventing the reception of the unit read command sequences from the memory controller MC. When No is determined in the determination process of S203 or S206 after the process of S201, the dummy read control circuit 113 transitions the ready-busy signals R/Bn_1 and R/Bn_2 to the ready state, thereby starting the reception of the unit read command sequence. A method for preventing the reception of the unit read command sequence by the memory controller MC until No is determined in the determination process of S203 or S206, is not limited to this.

The dummy read control circuit 113 determines whether the unit read operation has been completed for all blocks which are targets of the patrol read operation (S209).

The determination of S209 can be executed by any method. In one example, when the unit read operation is completed for all blocks BLK whose block addresses are recorded in the access history information 120, the dummy read control circuit 113 may determine that the unit read operation has been completed for all blocks which were targets of the patrol read operation.

When the unit read operation for any block which is the target of the patrol read operation is not yet completed (S209: No), the control transitions to S207.

When the unit read operation is completed for all blocks which were targets of the patrol read operation (S209: Yes), the dummy read control circuit 113 resets the value of the timer 112 and restarts the timer 112 (S210). Then, the control transitions to S201.

Figure 14:
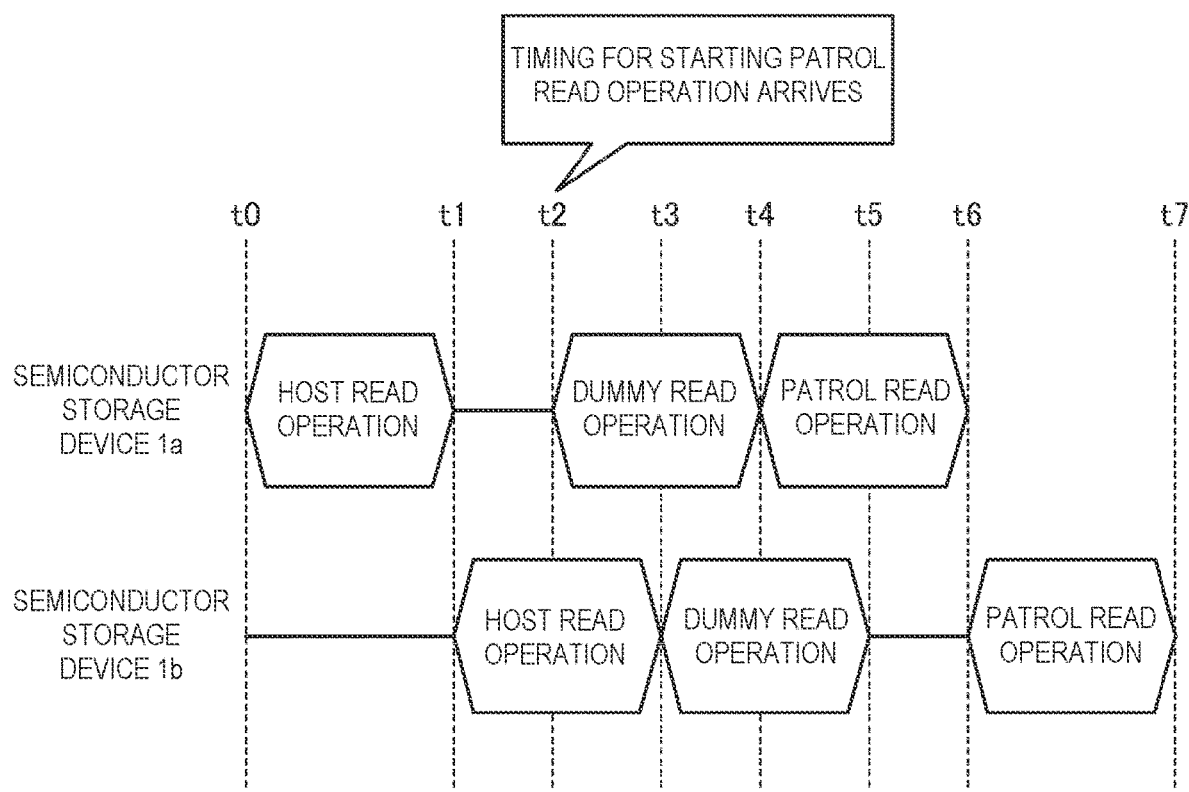
FIG. 14 is a timing chart showing an example of temporal transitions of operations in a plurality of semiconductor storage devices according to an embodiment.

FIG. 14 is a timing chart showing an example of the temporal transition of operations in a plurality of semiconductor storage devices according to the embodiment. In FIG. 14, the semiconductor storage devices 1a and 1b are taken as examples of a plurality of semiconductor storage devices in order to avoid complicating the description.

In the example shown in FIG. 14, a host read operation is executed on the semiconductor storage device 1a from time t0 to time t1, and a host read operation is executed on the semiconductor storage device 1b from time t1 to time t3. In the host read operation, the host channel HCH is occupied by communication between a semiconductor storage device 1 and the memory controller MC. Therefore, the host read operation for each of the semiconductor storage devices 1*a* and 1*b* is serially executed in time like the two host read operations from time t0 to t3.

It is assumed in this example that the time for starting the patrol read operation arrives at time t2. The arrival of the time for starting the patrol read operation means, for example, that the value of the timer 45 reaches the first value in the memory controller MC and the value of the timer 112 reaches the second value in each bridge chip BC.

In the semiconductor storage devices 1*a* and 1*b*, each bridge chip BC knows that the time for starting the patrol read operation arrives at time t2 based on the timer 112. Also, at time t2, the memory controller MC knows that the time for starting the patrol read operation arrives based on the timer 45.

At time t2, access to a memory chip CP is not being executed in the semiconductor storage device 1*a*. Therefore, the bridge chip BC of the semiconductor storage device 1*a* determines No in the determination process in S202 of FIG. 12, specifies a block BLK which is the target of the patrol read operation, and commands the memory chip CP including the block BLK to perform a dummy read operation for the specified block BLK.

At time t2, the access to a memory chip CP is being executed (here, the host read operation) in the semiconductor storage device 1*b*. Therefore, the bridge chip BC of the semiconductor storage device 1*b* waits for the completion of the host read operation by determining Yes in the determination process in S202 of FIG. 12. After the host read operation is completed, that is, at time t3, the bridge chip BC of the semiconductor storage device 1*b* now determines No in the determination process in S202 of FIG. 12, specifies a block BLK which is the target of the patrol read operation, and commands the memory chip CP including the block BLK to perform a dummy read operation on the specified block BLK.

In the semiconductor storage devices 1*a* and 1*b*, each bridge chip BC repeats the dummy read operation command until a dummy read operation for all blocks BLK which are targets of the patrol read operation is completed.

In the semiconductor storage device 1*a*, the dummy read operation for all blocks BLK which are targets of the patrol read operation is completed at time t4. At this point, the memory controller MC executes the patrol read operation on the semiconductor storage device 1*a*. Specifically, the memory controller MC transfers a unit read operation command for each block BLK which is the target of the patrol read operation.

In the semiconductor storage device 1*b*, the dummy read operation for all blocks BLK which are targets of the patrol read operation is completed at time t5. However, at time t5, the host channel HCH is occupied by the transfer of the unit read operation command to the semiconductor storage device 1*a*, so the memory controller MC cannot transfer the unit read operation command to the semiconductor storage device 1*b* at this point.

At time t6, the patrol read operation in the semiconductor storage device 1*a*, that is, the unit read operation for all blocks BLK which are targets of the patrol read operation is completed. Now, since the host channel HCH becomes available, the memory controller MC executes the patrol read operation for the semiconductor storage device 1*b*. Specifically, the memory controller MC transfers the unit read operation command for each block BLK which is the target of the patrol read operation. Then, at the time t7, the patrol read operation for the targeted blocks BLK in the semiconductor storage device 1*b* is completed.

As described above, according to the embodiment, the bridge chip BC is configured to transfer the dummy read command sequence for commanding the dummy read operation to the memory chip CP via the second interface 12, independently of a unit read command sequence being received from the memory controller MC via the first interface 11.

As a result, as seen from the operation of each semiconductor storage device 1 at times t2 to t5 in FIG. 14, the bridge chip BC of each semiconductor storage device 1 can start the dummy read operation command to the memory chip CP even when, for example, an operation occupying the host channel HCH is being executed in another semiconductor storage device 1. Therefore, it is possible to reduce the time required for the patrol read operation, more precisely, the total time required for a preliminary dummy read operation and the patrol read operation associated therewith.

Also, according to the embodiment, the bridge chip BC includes the timer 112. The controller 10 uses the timer 112 to determine whether the time for starting the patrol read operation arrives.

Therefore, the bridge chip BC can send the dummy read operation command to a memory chip CP before the patrol read operation.

Also, according to the embodiment, the controller 10 transfers the command sequence for the unit read operation to the memory chip CP after issuing the dummy read operation command to the memory chip CP.

Therefore, the bridge chip BC can send the dummy read operation command to the memory chip CP before the patrol read operation.

In the embodiment, description is performed assuming that the memory controller MC executes the control of the patrol read operation. However, in other examples, some or all of the control of the patrol read operation may be executed in a bridge chip BC. For example, when the bridge chip BC detects the arrival of the time for starting the patrol read operation, the bridge chip BC sends the dummy read operation command to the memory chip CP without receiving a dummy read operation command from the memory controller MC. Then, after executing the dummy read operation for all the blocks BLK which are targets of the patrol read operation, the bridge chip BC may then send the unit read operation command for the memory chip CP without receiving the unit read operation command from the memory controller MC.

Also, in the embodiment, the access history information 120 is stored in the flash memory 14 which is a non-volatile memory. A volatile memory can be provided in the bridge chip BC, and the access history information 120 may be stored in this volatile memory.

When the access history information 120 is stored in volatile memory, the controller 10 operates, for example, as follows. When the power supply to the memory system SYS is stopped, the controller 10 saves the access history information 120 in the volatile memory to any of the memory chips CP. After that, when the power supply to the memory system SYS is resumed, the controller 10 reads the access history information 120 from the memory chip CP and restores the access history information 120 in the volatile memory.

Also, in the embodiment, the unit read operation is executed for all the blocks BLK which are targets of the patrol read operation in the memory system SYS whenever the time for starting the patrol read operation arrives. The memory system SYS may be configured such that the unit read operation is completed for all blocks BLK which are targets of the patrol read operation in the memory system SYS in such a way that the unit read operation can be executed for less than all of the blocks BLK which are targets of the patrol read operation in the memory system SYS whenever the time for starting the patrol read operation arrives and the time for starting the patrol read operation arrives a plurality of times.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor integrated circuit, comprising:
a first interface circuit configured to be connected to a control device;
a second interface circuit configured to be connected to a memory chip; and
a controller configured to:
generate and transfer a first command sequence for commanding a dummy read operation on a storage region of the memory chip via the second interface circuit before any patrol read operation is executed on the storage region of the memory chip, the patrol read operation being initiated based on a request from the control device received via the first interface circuit and instructed to the memory chip via the second interface circuit, the first command sequence being generated independently and transferred separately from the request from the control device.

2. The semiconductor integrated circuit according to claim 1, wherein the first command sequence is transferred to the memory chip before the request from the control device is received.

3. The semiconductor integrated circuit according to claim 1, further comprising:
a timer, wherein
the controller is configured to transfer the first command sequence to the memory chip based on the output of the timer.

4. The semiconductor integrated circuit according to claim 1, further comprising:
a third interface circuit configured to be connected to another memory chip, wherein
the controller is further configured to:
transfer another first command sequence for commanding a dummy read operation on a storage region of the another memory chip via the third interface circuit before executing a patrol read operation on the storage region of the another memory chip based on another request from the control device received via the first interface circuit.

5. The semiconductor integrated circuit according to claim 4, wherein the another first command sequence is transferred to the another memory chip before the another request from the control device is received.

6. The semiconductor integrated circuit according to claim 1, wherein the controller is further configured to transfer a second command sequence for commanding the patrol read operation to the memory chip after the first command sequence has been completely transferred to the memory chip.

7. A semiconductor storage device, comprising:
a plurality of memory chips; and
a bridge chip including:
a first interface circuit configured to be connected to a control device; and
a second interface circuit connected to a first group of memory chips in the plurality of memory chips; and
a controller configured to:
generate and transfer a first command sequence for commanding a dummy read operation on a storage region of a memory chip in the first group via the second interface circuit before any patrol read operation is executed on the storage region of the memory chip, the patrol read operation being initiated based on a request from the control device received via the first interface circuit and instructed to the memory chip via the second interface circuit, the first command sequence being generated independently and transferred separately from the request from the control device.

8. The semiconductor storage device according to claim 7, wherein the first command sequence is transferred to the memory chip before the request from the control device is received.

9. The semiconductor storage device according to claim 7, further comprising:
a timer, wherein
the controller is configured to transfer the first command sequence to the memory chip based on the output of the timer.

10. The semiconductor storage device according to claim 7, wherein the bridge chip further includes:
a third interface circuit connected to a second group of memory chips in the plurality of memory chips; and
the controller is further configured to:
transfer another first command sequence for commanding a dummy read operation on a storage region of a memory chip in the second group via the third interface circuit before executing a patrol read operation on the storage region of the memory chip in the third group based on another request from the control device received via the first interface circuit.

11. The semiconductor storage device according to claim 10, wherein the another first command sequence is transferred to the memory chip of the third group before the another request from the control device is received.

12. The semiconductor storage device according to claim 7, wherein the controller is further configured to transfer a second command sequence for commanding the patrol read operation to the memory chip of the first group after the first command sequence has been completely transferred to the memory chip of the first group.

13. The semiconductor storage device according to claim 7, wherein the plurality of memory chips are NAND flash memory chips.

14. The semiconductor storage device according to claim 7, wherein the storage region is a memory block.

15. The semiconductor storage device according to claim 7, wherein the control device is a memory controller.

16. A memory system, comprising:
a control device;
a bus;
a plurality of memory chips; and a plurality of semiconductor integrated circuits, each connected to the control device via the bus and including:

a first interface circuit connected to the control device via the bus;

a second interface circuit connected to a memory chip of the plurality of memory chips; and a controller configured to generate and transfer a first command sequence for commanding a dummy read operation on a storage region of the memory chip via the second interface circuit before any patrol read operation is executed on the storage region of the memory chip, the patrol read operation being initiated based on a request from the control device received via the first interface circuit and instructed to the memory chip via the second interface circuit, the first command sequence being generated independently and transferred separately from the request from the control device.

17. The memory system according to claim 16, wherein the first command sequence is transferred to the memory chip before the request from the control device is received.

18. The memory system according to claim 16, further comprising:

a timer, wherein the controller is configured to transfer the first command sequence to the memory chip based on the output of the timer.

19. The memory system according to claim 16, each semiconductor integrated circuit further comprising:

a third interface circuit configured to be connected to another memory chip of the plurality of memory chips, wherein the controller is further configured to:

transfer another first command sequence for commanding a dummy read operation on a storage region of the another memory chip via the third interface circuit before executing a patrol read operation on the storage region of the another memory chip based on another request from the control device received via the first interface circuit.

20. The memory system according to claim 16, wherein, while one of the plurality of semiconductor integrated circuits is executing the dummy read operation on one of the plurality of memory chips, another semiconductor integrated circuit of the plurality of semiconductor integrated circuits is configured to perform the patrol read operation on another memory chip of the plurality of memory chips without receiving the request from the control device.

* * * * *